United States Patent [19]
Martin, Jr.

[11] Patent Number: 5,286,081
[45] Date of Patent: Feb. 15, 1994

[54] PANEL CAB

[75] Inventor: Robert P. Martin, Jr., Cleveland, Ohio

[73] Assignee: Martin Sheet Metal, Inc., CLeveland, Ohio

[21] Appl. No.: 7,336

[22] Filed: Jan. 21, 1993

[51] Int. Cl.⁵ .............................................. B62D 33/06
[52] U.S. Cl. .................... 296/190; 296/102; 180/89.12
[58] Field of Search ............... 296/190, 102; 180/89.12

[56]  References Cited
U.S. PATENT DOCUMENTS

| | | | |
|---|---|---|---|
| 4,082,343 | 4/1978 | Hurt, II et al. | 296/190 |
| 4,135,757 | 1/1979 | Smith et al. | 296/190 |
| 4,184,712 | 1/1980 | Skahill | 296/190 |
| 4,688,846 | 8/1987 | Martin, Jr. | 296/102 |
| 5,150,942 | 9/1992 | Fujan et al. | 296/190 |

Primary Examiner—Robert R. Song
Attorney, Agent, or Firm—Pearne, Gordon, McCoy & Granger

[57] ABSTRACT

Cab panel structures and methods for their assembly on an overhead guard of a land vehicle. A metal roof panel can be used alone or with a metal frame windshield panel for a partial enclosure. The metal roof and windshield panels can be used with complimentary fabric panels that afford a full enclosure or with complimentary steel panels that afford a full enclosure of high durability. The metal panels are attached to the overhead guard posts in a unique clamp-on method that avoids the need for direct fastening of the guard and, accordingly, allows rapid installation.

8 Claims, 4 Drawing Sheets

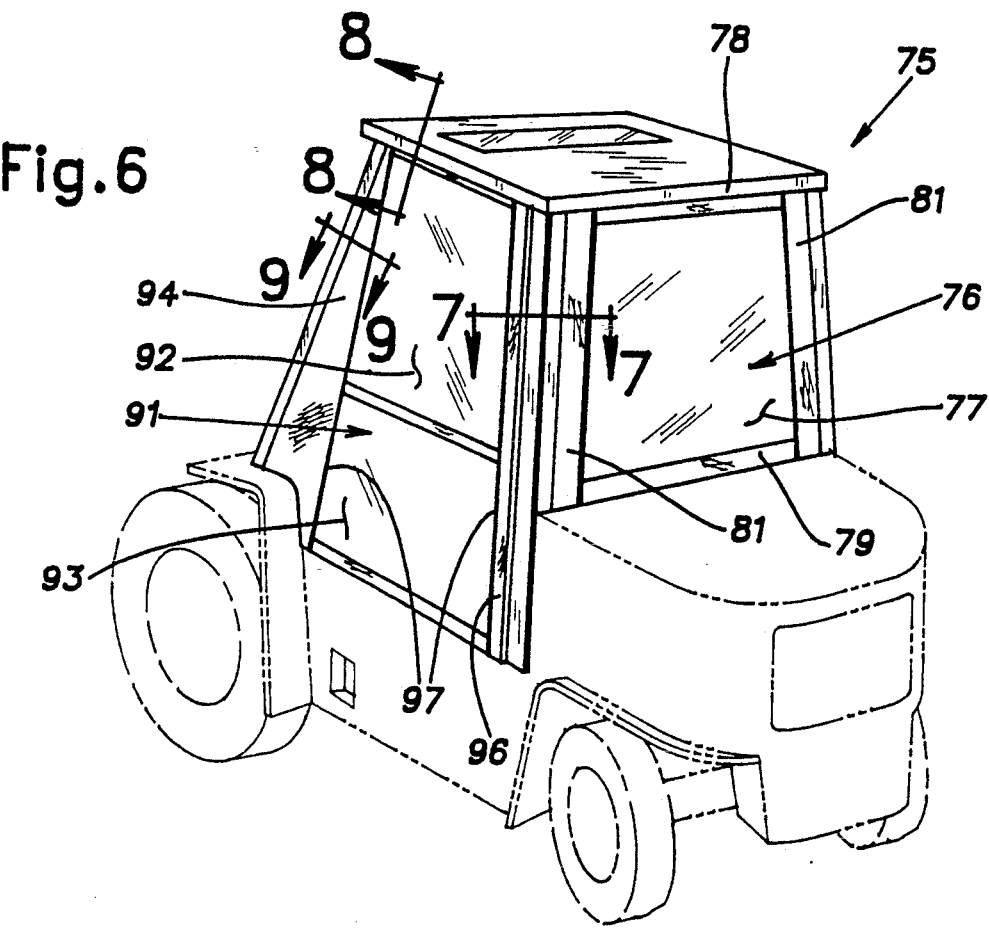

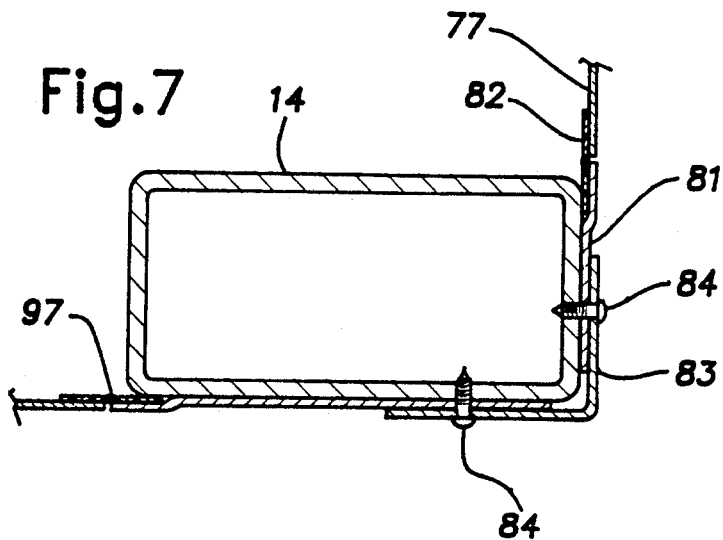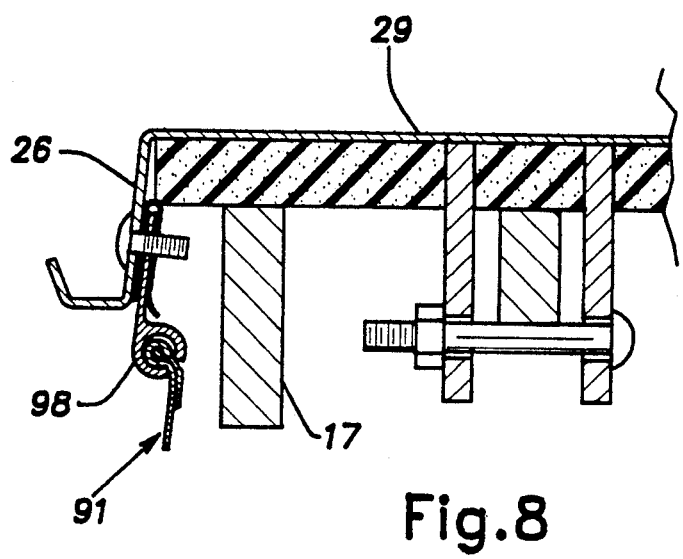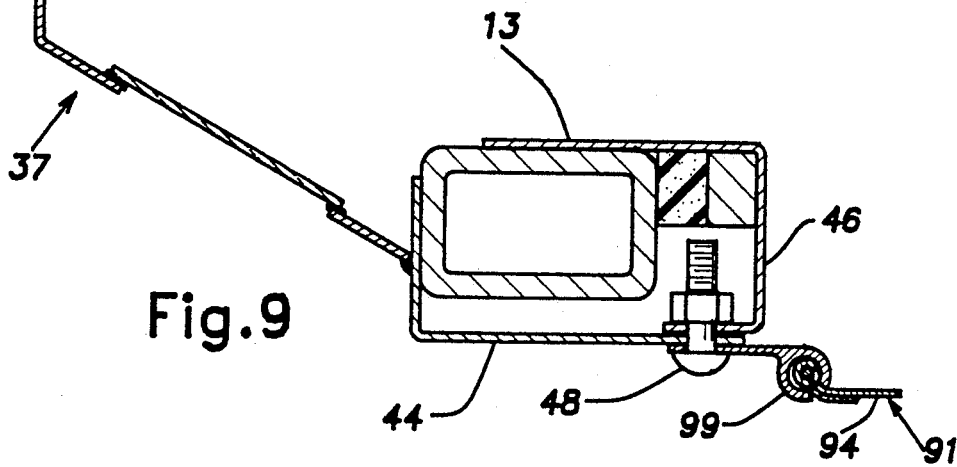

PANEL CAB

The invention relates to cabs for land vehicles and, more particularly, pertains to enclosures for such vehicles having overhead guards for the operator.

BACKGROUND OF THE INVENTION

Lift trucks, construction equipment, farm tractors, and similar vehicles frequently are manufactured with overhead guard or cage-like structures to protect the driver/operator from injury from falling objects or overturning of the vehicle. Typically, these guards are ruggedly constructed and may be welded directly to the frame, subframe or platform of the vehicle and in such cases are not readily removable from the frame or subframe. Often, a vehicle will be destined for use in an environment that is hostile to the operator. Adverse conditions for the operator include operation in excessively warm or cold environments, rain, dust and the like. In these and other conditions, it is common to provide a cab or enclosure on the vehicle to protect the driver from exposure. The cabs, known in the prior art, can range from simple weatherproof fabric and vinyl covers attached to the overhead guard to sophisticated sheet metal structures with safety glass windshields, side lights and an overhead light. In many instances, metal cabs have been constructed with sufficient rigidity to serve for overhead protection in place of an overhead guard originally fitted or specified on the vehicle. Where the overhead guard originally supplied on a vehicle is fabricated as a weldment that is integrated with the frame or platform of the vehicle it may not be practical to remove the overhead guard and replace it with a self-supporting cab. It is known to construct a cab by assembling panels on an overhead guard but as far as is known this approach has had limited success because of the high labor content that results from the effort and skill required to produce prior art assemblies with acceptable quality and finish.

SUMMARY OF THE INVENTION

The invention provides a panel-type cab construction for a vehicle that assembles easily on an overhead guard in a manner that avoids the need for significant, if any, welding, drilling, screwing, riveting or like direct fastening means to the guard structure. In accordance with the invention, rigid panels are arranged to interlock, typically by encircling, wrapping or otherwise embracing with abutting parts of the guard. The panel construction can be supplied in one of several distinct versions to satisfy a customer's requirements and yield a corresponding economy.

A first version or stage of the cab is represented by a roof plate unit that can be assembled on the guard with a simple shackle arrangement. As disclosed, the roof plate can be provided with a resilient material such as a foam sheet positioned between the roof plate and the upper surfaces of the guard. The resilient material serves to simplify the assembly of the roof plate unit and the overhead guard, reduces the potential for vibration therebetween and offers potential noise abatement.

A second version or stage of the cab includes a front panel unit that provides a safety glass windshield. The front panel unit includes, at its sides, elements that interlock with the front posts of the overhead guard. In the disclosed arrangement, the front panel unit includes, at both vertical edges, channel elements assembled together and substantially encircling the respective corner posts. The assembly is accomplished with threaded fasteners that are received substantially exclusively in the panel elements themselves and that do not require registration with holes or slots in elements of the guard proper.

In a third version or stage, the cab includes a fabric covering for its rear and side faces. The sides includes door-like flaps releasably closed with zippers or other retaining means. As disclosed, the roof panel unit and front windshield unit can be fitted with means for convenient attachment of the fabric rear panel and fabric side panels.

A fourth version or stage of the cab affords an all metal enclosure supported on the overhead guard. A rear panel unit is attached to a pair of rear uprights of the overhead guard in a manner similar to that by which the front panel unit is attached to the front uprights. The rear panel unit, in the disclosed manner, provides hinge mounts for side doors. The side doors, spanning the area between the front and rear posts, from the side panels complete the enclosure of the cab.

The disclosed panel cab construction offers numerous advantages over conventional panelized cab construction. The metal cab components are prefinished before assembly. Only a limited number of assembly steps and operations are necessary to complete an installation. Since the cab can be fully assembled on an existing overhead cab in a limited number of minutes, rather than hours typical of the prior art, it is practical to install it at an assembly line station of the factory where the vehicle is being manufactured. This allows a manufacturer to offer full flexibility in marketing its vehicle with or without a cab. The manufacturer can supply the same cab design to its dealers to be installed by them without requiring extensive time or skill on their part to perform the installation. Similarly, a dealer can sell the cab to a previous purchaser of the vehicle in instances where the owner decides to retrofit the vehicle with a cab. Since the various faces of the enclosure are panel-like in their configuration, the cab can be shipped in a relatively small container. The cab construction and its assembly technique is tolerant of dimensional variation in the overhead guard thereby avoiding restrictions on the manufacturer of the overhead guard itself. The various parts of the cab are, for the most part, compatible from the basic lower stage to the fully developed all metal stage. This characteristic reduces the number of components which the cab manufacturer must produce and inventory and thereby leads to significant savings in manufacturing costs.

BRIEF DESCRIPTION OF THE DRAWINGS

FIG. 6 is a rear perspective view of another embodiment of a cab assembly constructed in accordance with the invention;

FIG. 7 is a fragmentary cross-sectional view of the cab taken in the plane indicated at 7—7 in FIG. 6;

FIG. 8 is a fragmentary cross-sectional view of the cab taken in the plane indicated at 8—8 in FIG. 6; and FIG. 9 is a fragmentary cross-sectional view of the cab taken in the plane indicated at 9—9 in FIG. 6.

DESCRIPTION OF THE PREFERRED EMBODIMENTS

Figure 1:
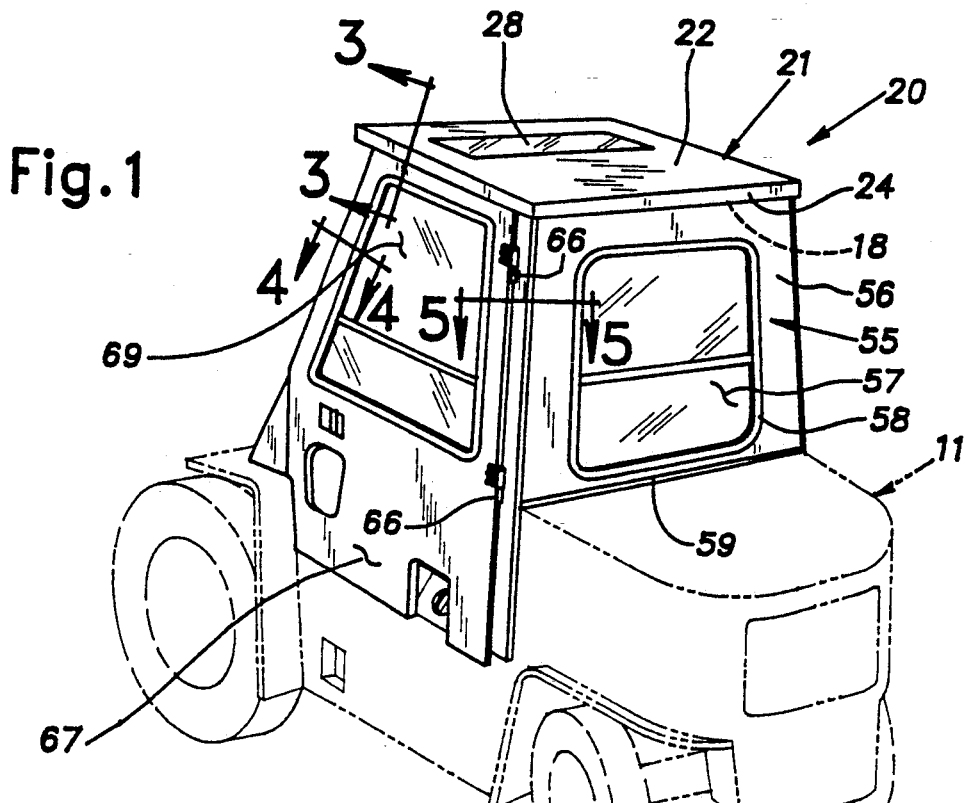
FIG. 1 is a rear perspective view of one embodiment of a cab assembly constructed in accordance with the invention.
Figure 2:
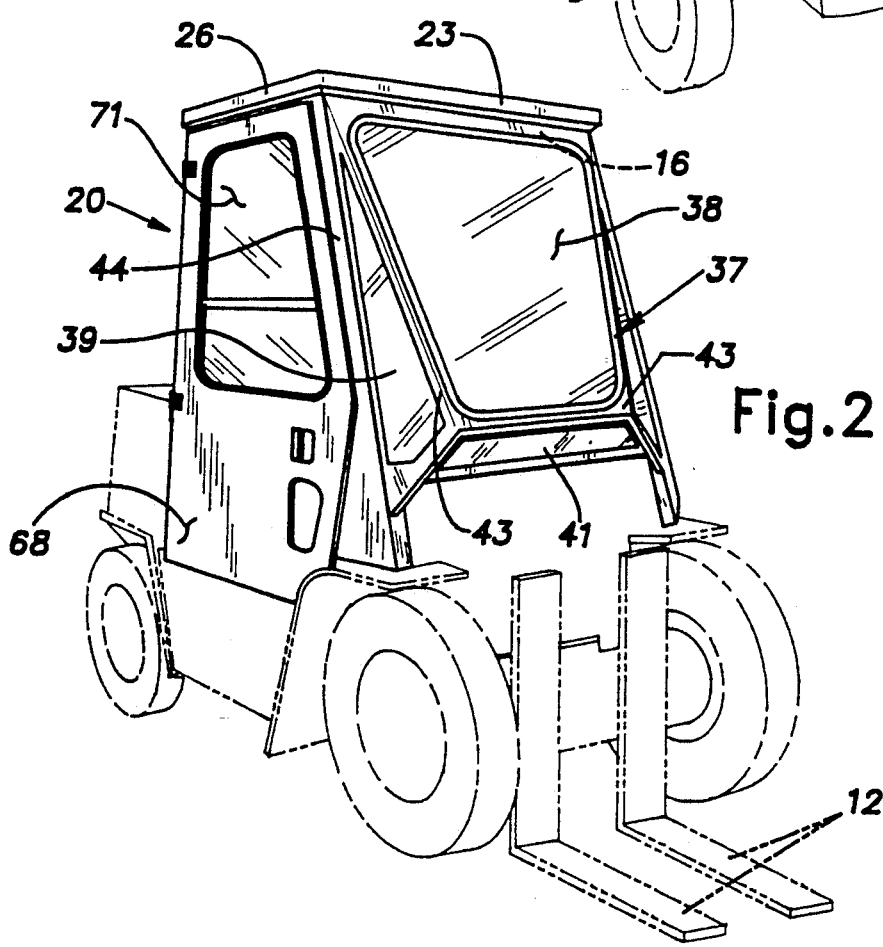
FIG. 2 is a front perspective view of the cab of FIG. 1.
Figure 3:
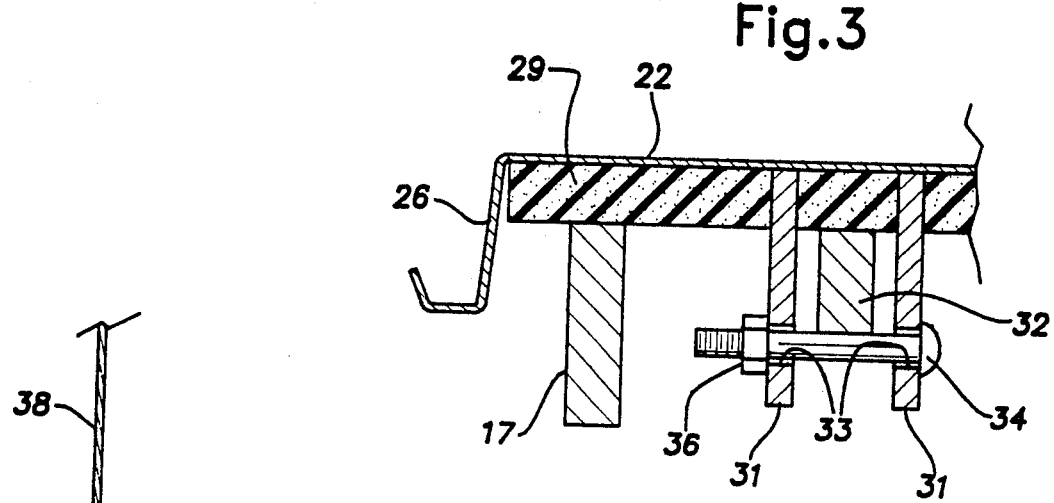
FIG. 3 is a fragmentary cross-sectional view of the cab taken in the plane indicated at 3—3 in FIG. 1.

Cab structures constructed in accordance with the invention are installed on a work vehicle shown in phantom at 11 in FIGS. 1 and 2. The illustrated vehicle 11 is a generally conventional fork lift truck, supported on front and rear sets of wheels and having a fork 12 at its front end. The various cab structures overlie and protect the station where the person operating the vehicle sits. The disclosed cab structures are assembled on a rigid space frame typically formed of rectangular steel tubing or like material that is conventionally supplied with the vehicle to guard the operator from overhead falling objects. The overhead guard frame is in the general configuration of the outline of a box with rectangular or trapezoidal faces. The overhead guard frame is welded, bolted or otherwise secured to the frame or subframe of the vehicle 11. The overhead guard frame typically is a weldment that includes generally upright front and rear corner posts 13, 14 and generally horizontal front, side and rear header elements 16, 17 and 18. As indicated, the corner posts 13, 14 can be formed of rectangular or square steel tubing and their faces are generally aligned with the faces of the imaginary box outlined by the guard and by the cab structures disclosed herein.

The upper or top face of the guard can have a grate-like structure to provide both protection from falling objects and a view of the area above the guard and forward of the operator station.

FIGS. 1–5 illustrate an "all metal" version of a cab 20 constructed in accordance with the invention. Typically, the metal components of the cab 20 are fabricated from steel sheet, plate, tube and bar. The cab 20 includes a roof plate unit 21 that is primarily comprised of a generally flat steel sheet 22. The edges of the steel sheet 22 are broken down in the front and rear to form drip edges or flanges 23, 24 and at the sides to form rain gutters or flanges 26. The sheet 22 is proportioned so that the drip edges 23, 24 overhang their respective front and rear faces of the cab. The side flanges or gutters 26 are spaced away from the side faces of the overhead guard for purposes discussed below. The roof sheet 22 can include a rectangular hole covered by a transparent light 28 of durable plastic material such as polycarbonate, to provide overhead-forward vision. A layer of resilient material 29 such as a sheet of elastomeric foam is fixed to a lower face of the roof sheet 22 in areas surrounding the light 28. Adjacent each of the four corners of the roof plate unit 21 a pair of fastening tabs 31 are welded or otherwise affixed to the lower face of the sheet 22. The tabs 31 depend perpendicularly to the plane of the sheet 22. The individual sets of tabs 31 are strategically located on the roof sheet 22 so that when the roof plate unit 21 is properly positioned on the overhead guard, each pair of tabs straddles a bar 32 of the overhead guard in the manner of a shackle. The lower or distal ends of the tabs 31 have aligned holes 33. The holes 33 are positioned so that when cross bolts 34 are assembled in them, the bolts reliably hold the roof plate unit 21 in place with the resilient material 29 slightly compressed between the sheet 22 and the top of the bars 32 of the overhead guard. The bolts 34 are retained in place by locknuts 36. The resilient material 29, consequently, ensures that the roof plate unit 21 remains rattle free on the overhead guard and affords the potential of sound abatement.

Figure 4:
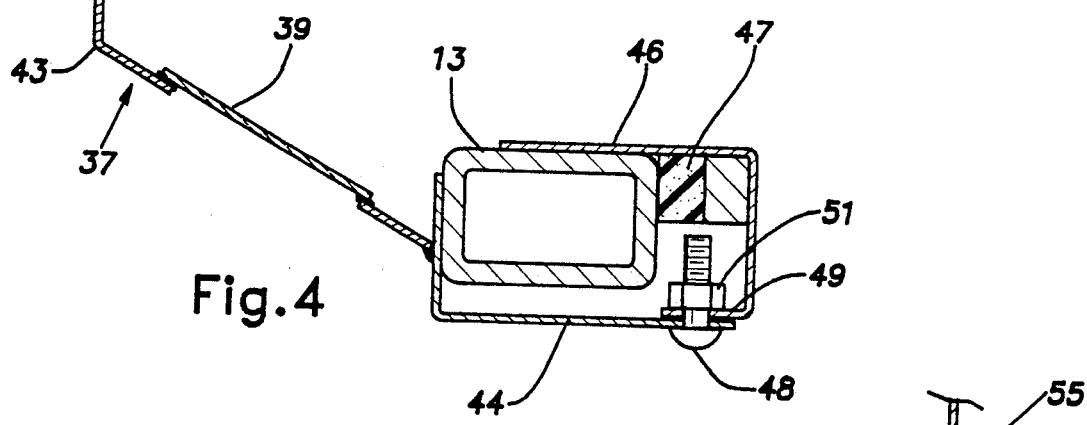
FIG. 4 is a fragmentary cross-sectional view of the cab taken in the plane indicated at 4—4 in FIG. 1.
Figure 5:
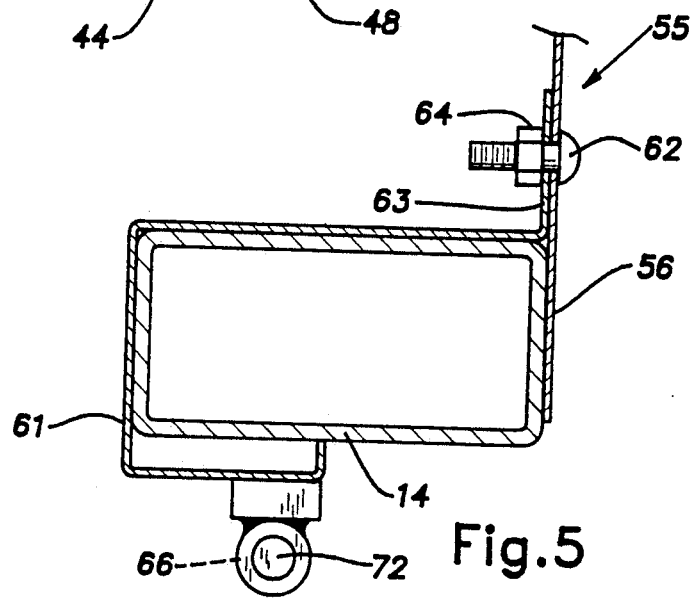
FIG. 5 is a fragmentary cross-sectional view of the cab taken in the plane indicated at 5—5 in FIG. 1.

The cab 20 includes a front panel unit 37 comprised of a sheet metal framework that supports a bay windshield 38, side lights 39 and a lower light 41. The profile of the framework, designated 43, of the front panel unit 37 generally corresponds to the profile of the front face of the overhead guard. The framework 43 is preferably a weldment that provides a rigid sheet steel frame that supports the peripheral edges of each of the bay windshield 38 and lights 39, 41. The windshield 38, ideally, is laminated safety glass glazed with conventional extruded rubber stock 42. The side and lower lights 39 and 41 can be transparent plastic such as polycarbonate and can be glazed by adhesively securing their perimeters to the framework 43. The projecting or bay windshield design offers a high degree of visibility through the side and bottom lights 39, 41. Where this high visibility is not necessary or physical constraints exist, the windshield can be enlarged or otherwise configured and the side and bottom lights can be eliminated to provide a relatively flat front panel unit. The windshield framework 43 includes at its sides a pair of edge flange members 44 that are arranged to extend along the front generally upright posts 13 of the overhead guard. More specifically, the illustrated edge flange members 44 are sheet metal elements having a right angle cross section adapted to overly the front and side faces of the respective rectangular tube corner posts 13 as shown in FIG. 4. At each vertical edge of the framework 43 is an elongated sheet metal cap 46 having, in the illustrated case, a J-shape in cross-section. At each side of the cab 20, the edge flange member 44 and cap 46, when assembled, envelope and interlock with the respective front generally upright post 13 of the overhead guard. In the illustrated case, the edge flange members 44 and caps 46 are proportioned oversize of the post 13. The cap includes an elastomeric foam spacer along its length proportioned to abut a rear face of a front post 13 and hold a face of the flange member against a front face of a post 13. The edge flange member 44 and cap 46, at each edge of the front panel unit 37, are held in assembled relation on a post 13, in the illustrated case, with a plurality of fastening screws 48 spaced along the length of each post 13. The screws 48 are assembled through holes in the flange members 44 and are received into aligned holes in confronting lips 49 of the caps 46 and into prepositioned caged nuts 51 or other fastening means on the lips. The caps 46, preferably, extend along substantially the full length of the flange members 44 forming the vertical edges of the front panel unit 37 and, more particularly, along substantially the full length of the associated post 13.

A rear panel unit 55 of the cab 20 includes a generally flat steel sheet 56 that has a profile generally corresponding to the rear profile of the overhead guard. A rectangular rear light or window 57 is mounted in the rear sheet 56 by a frame 58. The rear window 57 is a double-hung unit that has its lower pane slidable upwardly in a known manner for clearance when the operator's seat is tilted backward for service of the vehicle. A lower edge of the sheet or panel 56 is bent out to form a flange on which a weather seal 59 is attached. The rear panel unit 55 includes a flanged J- channel cap 61 associated with each generally vertical edge of the steel panel 56. The caps 61 are assembled to the rear panel sheet 56 with screws 62. In particular, a plurality of screws 62 spaced vertically along the cap 61 are assembled through aligned horizontal slots or holes in the panel 56 and holes in an abutting flange 63 of the cab 61. The threaded screws 62 are received in internally threaded nuts 64 on the flanges 63.

When the rear panel 56 and J-channel caps 61 are assembled together over the respective rear posts 14 of the overhead guard, the rear panel unit 55 is mechanically interlocked in place on the overhead guard. Together, on the right and left side of the cab, portions of the rear panel sheet 56 and J-caps 61 encircle or envelope a major portion of the circumference of an associated post 14. The J-channel caps 61 have a length substantially equal to the length of the rear posts 14 and their flanges 63 substantially continuously abut the full height of the rear panel sheet 56. A pair of spaced coaxial hinge tubes or sockets 66 are welded on the outer or side faces of the J-channel caps 61.

It will be seen from the foregoing discussion that both the front panel unit 37 and the rear panel unit 55 can be assembled on their respective corner posts 13 or 14 without the requirement of securing these units by direct fastening means such as screws into the posts or welding directly onto the posts. The construction of the front and rear panel units allows these units to be reliably held in place on their respective posts 13 or 14 with the disclosed fastening screws that avoid direct contact with these posts. As a result, these panel units 37 and 55 can be installed on the overhead guard with minimal labor and time and such units do not require a high degree of dimensional accuracy in the fabrication of the overhead guard or in their own fabrication. In fact, it can be seen that as the sheet metal caps 46, or 61 are drawn tight by the respective fastening screws 48 or 62, these caps and the mating components of their respective panel units 37 or 55 are drawn into close alignment with the overhead guard posts.

A door or panel 67, 68 fabricated primarily from sheet steel is provided on each side of the cab 20. Each door includes a window or a side light 69, 71. A door, 67, 68 includes a pair of depending hinge pins 72 that are received in the hinge tubes 66 for pivotal support of the door 67, 68 on the cab. The doors 67, 68 form the side panels of the cab 20. Suitable latches, known in the art, are provided to selectively maintain the doors closed on the cab. An elastomeric seal can be provided on the periphery of each door 67, 68 to provide a tight seal with the side faces of the cab 20.

In circumstances when the durability of a full metal cab is not required but when it is desired to provide a full closure for the operator, the described roof plate unit 21 and front panel unit 37 can be complemented with fabric rear and side cab panels. Such a partial fabric cab 75 is illustrated in FIGS. 6-9. A rear fabric cover or panel 76 of suitable waterproof material, fabricated by sewing, includes a flexible transparent window area 77 of clear vinyl or similar material. Waterproof fabric strips 78, 79 are sewn to the top and bottom edges of the window 77. The vertical edges of the window 77 are releasably attached to waterproof fabric portions 81 by zippers 82 that release from the bottom to the top of the rear panel construction. Straps (not shown) can be used to hold the window, rolled up, adjacent the drip edge 24. The zippers 82 can be deployed to release the lower fabric strip 79 and vinyl window 77 for clearance of the operator's seat when it is tilted backward or for ventilating the cab interior. As shown in FIG. 7 the vertical fabric portions 81 of the rear panel are secured to the rear faces of the rear posts 14 by associated sheet metal angle caps 83. The angle caps 83 can be held in place by screws 84 threaded into the rear posts. The upper edge of the rear fabric panel 76 is supported on the cab in an extruded channel secured to the underside of the drip flange 24 of the roof plate unit. The channel (not shown), the manner by which it is secured to the drip flange 24, and the manner of securing the fabric in the channel, is the same as described below in connection with a like channel 98 in FIG. 8.

Fabric side panels 91 of the cab 75 are generally symmetrical and, like the rear panel 76, are fabricated by sewing waterproof opaque fabric and clear transparent vinyl fabric pieces together. A main part of a side panel 91 is comprised of clear vinyl portions 92, 93 that are secured to vertical sections 94, 96 by generally vertical zippers 97. The zippers 97, opening from the bottom of the side panel 91, allow the clear vinyl sections 92 and 93 to be used as a door and be rolled up for ventilation purposes. Straps (not shown) can be used to temporarily hold the door panels 92, 93 up adjacent the rain gutter 26 when desired. The front vertical section 94 of the side panel can include a clear vinyl insert if desired.

As shown in FIG. 8, the upper edge of the fabric side panel 91 is supported on the adjacent rain gutter 26 with an extruded channel 98. The channel 98 has a slot opening into a circular interior and the top edge of the fabric panel 91 is sewn around a cord in the manner of a binding and is slipped endwise into the channel. Similarly, the front generally vertical edge of the fabric side panel 91 is supported in a channel 99 secured to the respective edge flange member 44 of the front panel unit 37 by the screws 48 as shown in FIG. 9. The rear generally vertical edge of the fabric side panel 91 is retained to the rear post 14 by the sheet metal angle cap 83 in essentially the same manner as the rear fabric panel 75 as shown in FIG. 7.

There are situations in work environments where a full enclosure for the operator is not necessary. In such circumstances, the front windshield panel unit 37 can be used with the roof plate unit 21 and neither side panels nor a rear panel need be provided. In still other situations, the roof panel unit 21 can be used alone without the windshield panel unit to provide moderate protection against sun and rain. It will be appreciated from the foregoing descriptions that the same roof plate unit 21 and front windshield panel unit 37 can be used with either the all metal cab 20 or with the part metal and part fabric cab 75. This versatility of these components is of great advantage to the manufacturer and the installer of these products since economies of scale are achieved and reductions in inventory are realized.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A cab enclosure for a land vehicle having an open cage-like overhead guard including generally vertical corner posts comprising a generally horizontal roof panel and at least one generally vertical face panel adapted to be fixed to the overhead guard, said one panel being a rigid body having generally vertical edges each extending along an associated generally vertical post of the overhead guard, cap means and fastener means for securing said cap means and said face panel together in assembled relation, said cap means and face panel in assembled relation embracing a sufficient circumferential extent of a post to securely retain said face panel on said associated posts, said fastener means being capable of holding said face panel on said associated posts during ordinary service of said vehicle without direct fastening between said cap means or said face panel and the associated posts.

2. A cab enclosure as set forth in claim 1, wherein said posts define a face of a cab and the posts have surfaces at their defined face, said edges of said face panel each overlying an adjacent surface of one of said posts, said cap means comprising an elongated channel-like element fastened to the face panel, the channel-like elements having a length that is at least equal to a majority of the height of the face panel.

3. A cab enclosure as set forth in claim 1, wherein the assembly of the face panel and cap means provides spaced hinge mounting means on a side of the overhead guard adapted to support a door thereon.

4. A method of constructing an enclosure on a vehicle having an overhead guard that includes generally upright support posts comprising the steps of forming a rigid panel adapted to span the area between the posts, the panel being formed with marginal areas proportioned to extend along the upright posts, forming post cap elements, aligning the panel with the posts, assembling the post cap elements with the marginal areas of the panel in a manner by which the posts are wrapped to a degree sufficient to secure the panel on the posts, the assembly of the panel and post cap elements being accomplished in a manner that avoids the need for any significant direct fastening of the panel to the posts.

5. A method as set forth in claim 4, wherein the assembly of the panel and post cap elements is accomplished with screws passing through both said panel and said cap elements.

6. A cab kit for assembly with the overhead guard of a land vehicle, comprising a plurality of rigid roof plate units, a plurality of rigid front windshield panel units, a plurality of rigid rear panel units, a plurality of pairs of rigid right and left side doors, a plurality of fabric rear panels and a plurality of pairs of fabric right and left side panels, each roof plate unit being arranged to be used separately or with the front windshield panel unit alone or in combination with a rigid rear panel unit and a pair of rigid doors or in combination with a fabric rear panel and a pair of fabric side panels, each front windshield unit being arranged to be used with a roof plate unit separately or in combination with a rigid rear panel unit and a pair of rigid side doors or in combination with a fabric rear panel and a pair of fabric side panels.

7. A cab kit as set forth in claim 6, wherein each roof panel unit has peripheral depending flanges adapted to be used to secure the upper margin of a fabric rear panel and a pair of fabric side panels and the front windshield unit is adapted to be used to secure the front margins of the pair of fabric side panels.

8. A roof plate unit for covering the upper face of an overhead guard comprising a generally rectangular flat steel body, a resilient material on a lower surface of the steel body, retaining means on the body at spaced locations, the retaining means being arranged to interlock on portions of the overhead guard, the retaining means being proportioned to hold the resilient material in compression against the top of the overhead guard when fully interlocked with the same.

* * * * *